(12) United States Patent
Li et al.

(10) Patent No.: US 10,338,710 B2
(45) Date of Patent: Jul. 2, 2019

(54) IN-CELL TOUCH PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Changfeng Li, Beijing (CN); Xue Dong, Beijing (CN); Haisheng Wang, Beijing (CN); Xiaochuan Chen, Beijing (CN); Lei Wang, Beijing (CN); Yingming Liu, Beijing (CN); Shengji Yang, Beijing (CN); Xiaoliang Ding, Beijing (CN); Weijie Zhao, Beijing (CN); Wei Liu, Beijing (CN); Hongjuan Liu, Beijing (CN); Jiantao Liu, Beijing (CN); Rui Xu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/100,129

(22) PCT Filed: Oct. 18, 2015

(86) PCT No.: PCT/CN2015/092147
§ 371 (c)(1),
(2) Date: May 27, 2016

(87) PCT Pub. No.: WO2016/206245
PCT Pub. Date: Dec. 29, 2016

(65) Prior Publication Data
US 2017/0192564 A1   Jul. 6, 2017

(30) Foreign Application Priority Data

Jun. 23, 2015 (CN) .......................... 2015 1 0349956

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G06F 3/044* (2013.01);
(Continued)

(58) Field of Classification Search
CPC .............................. G06F 3/0412; G06F 3/044
See application file for complete search history.

(56) References Cited

U.S. PATENT DOCUMENTS

2011/0310036 A1* 12/2011 Juan ...................... G06F 3/0412
                                                              345/173
2014/0111473 A1*  4/2014 Yang ...................... G06F 3/044
                                                              345/174
(Continued)

FOREIGN PATENT DOCUMENTS

CN         103353818 A        10/2013
CN         104020893 A         9/2014
(Continued)

OTHER PUBLICATIONS

Apr. 1, 2016—International Search Report—Intl App PCT/CN2015/092147 (with English translation).
(Continued)

*Primary Examiner* — Dong Hui Liang
(74) *Attorney, Agent, or Firm* — Banner & Witcoff, Ltd.

(57) ABSTRACT

An in-cell touch panel and a display device are disclosed, in the in-cell touch panel, each of the self-capacitance elec-
(Continued)

trodes includes a plurality of self-capacitance sub-electrodes which are insulated from each other and connecting lines for connecting the self-capacitance sub-electrodes; an orthographic projection on the first substrate of each self-capacitance sub-electrode does not overlap with an orthographic projection on the first substrate of each gate line; and/or an orthographic projection on the first substrate of each self-capacitance sub-electrode does not overlap with an orthographic projection on the first substrate of each data line. Thus, there is almost no overlapping area between the self-capacitance electrodes and the gate lines and/or there is almost no overlapping area between the self-capacitance electrodes and the data lines, thus there is almost no overlapping capacitance.

8 Claims, 4 Drawing Sheets

(51) Int. Cl.
*G02F 1/1333* (2006.01)
*G02F 1/1362* (2006.01)
*G02F 1/136* (2006.01)

(52) U.S. Cl.
CPC .................. *G02F 1/136286* (2013.01); *G02F 2001/13606* (2013.01); *G02F 2001/136231* (2013.01); *G02F 2201/40* (2013.01); *G06F 2203/04103* (2013.01); *G06F 2203/04111* (2013.01)

(56) References Cited

U.S. PATENT DOCUMENTS

| | | | |
|---|---|---|---|
| 2014/0118642 A1* | 5/2014 | Wang | G02F 1/13338 349/12 |
| 2014/0333582 A1* | 11/2014 | Huo | G02F 1/13338 345/174 |
| 2015/0091846 A1 | 4/2015 | Small | |
| 2015/0145812 A1* | 5/2015 | Sun | G06F 3/0412 345/174 |
| 2016/0274716 A1 | 9/2016 | Liu et al. | |
| 2016/0291791 A1* | 10/2016 | Qian | G06F 3/0418 |
| 2016/0357286 A1* | 12/2016 | Tsai | G06F 3/044 |

FOREIGN PATENT DOCUMENTS

| | | |
|---|---|---|
| CN | 104216584 A | 12/2014 |
| CN | 104238785 A | 12/2014 |
| CN | 104866161 A | 8/2015 |

OTHER PUBLICATIONS

Apr. 1, 2016—(WO) Written Opinion of ISA—Intl App PCT/CN2015/092147 (with English translation).

Nov. 22, 2018—(EP) Extended European Search Report Appn 15890161.1.

* cited by examiner

IN-CELL TOUCH PANEL AND DISPLAY DEVICE

The application is a U.S. National Phase Entry of International Application No. PCT/CN2015/092147 filed on Oct. 18, 2015, designating the United States of America and claiming priority to Chinese Patent Application No. 201510349956.7 filed on Jun. 23, 2015. The present application claims priority to and the benefit of the above-identified applications and the above-identified applications are incorporated by reference herein in their entirety.

TECHNICAL FIELD

At least one embodiment of the present disclosure relates to an in-cell touch panel and a display device.

BACKGROUND

Touch panels can be classified in accordance with composition structure as: add-on mode touch panels, on-cell touch panels, and in-cell touch panels. In an in-cell touch panel, touch electrodes of the touch panel are disposed inside a liquid crystal display panel, which can reduce the entire thickness of the module and reduce the manufacturing cost of the touch panel.

At present, an in-cell touch panel usually detects touch locations using the principle of mutual-capacitance or self-capacitance. Compared with a mutual-capacitance touch panel, the touch signal-to-noise ratio of a self-capacitance touch panel is higher, and the accuracy of touch sensing is higher accordingly.

Figure 1:
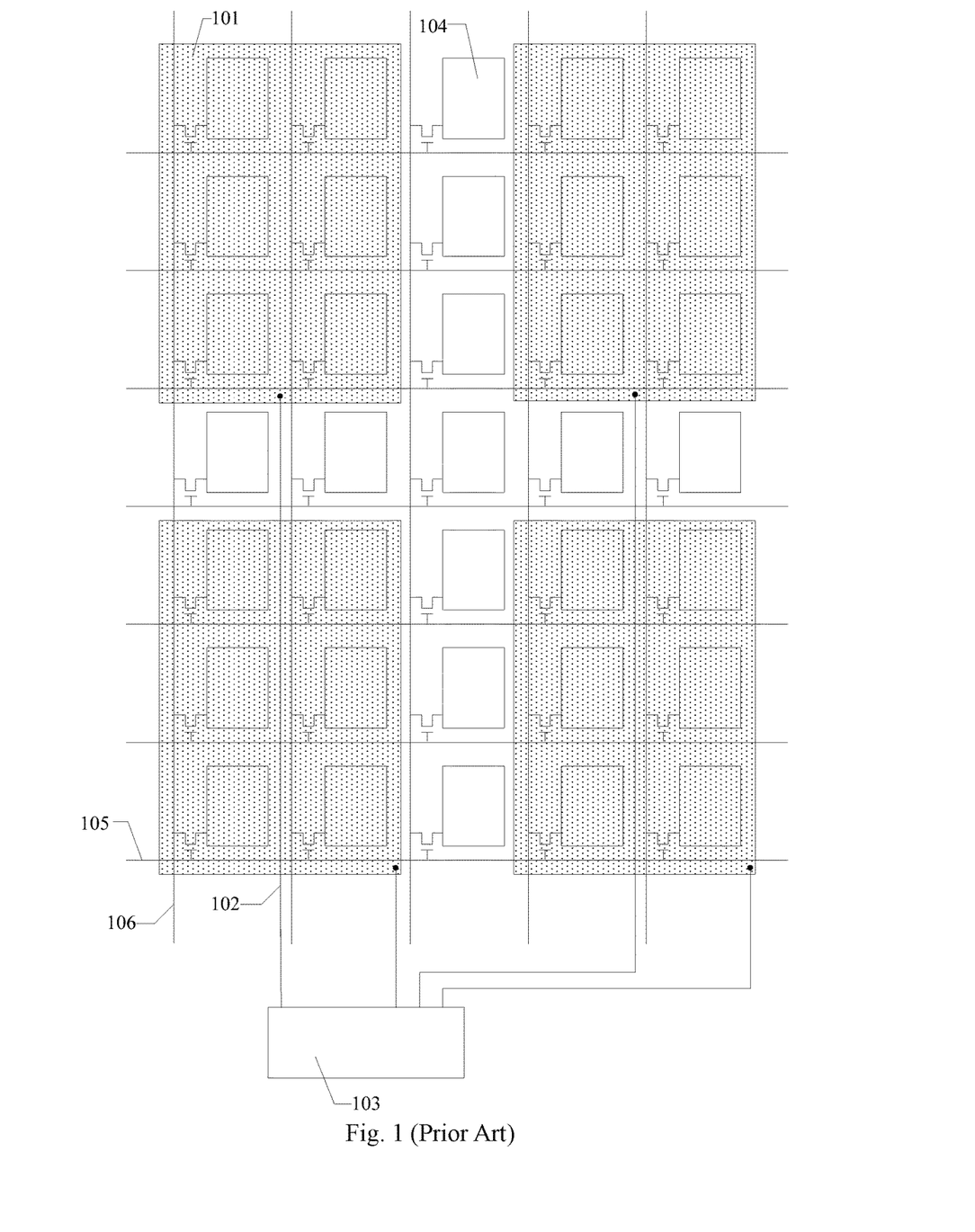
FIG. 1 is a structure schematic view of a self-capacitance touch panel.

In a typical self-capacitance touch panel, as shown in FIG. 1, a plurality of self-capacitance electrodes 101 which are disposed in a same layer and are insulated from each other as well as a plurality of conductive lines 102 which are in one-to-one correspondence with and electrically connected with the self-capacitance electrodes 101 are disposed. The self-capacitance electrodes 101 and a touch detecting chip 103 are electrically connected by the corresponding conductive lines 102. If the panel is not touched by a human body, the capacitance of each self-capacitance electrode is at a fixed value. If the panel is touched by a human body, the capacitance of the corresponding self-capacitance electrode is at a value of the fixed value plus the capacitance of the human body, and the touch location can be determined by the touch detecting chip through detecting the change of the capacitance value of each self-capacitance electrode in the touch period.

In the self-capacitance touch panel mentioned above, as shown in FIG. 1, the size of the self-capacitance electrode 101 is usually larger than the size of the pixel electrode 104. There is an overlapping area between the self-capacitance electrode 101 and the gate lines 105 and also between the self-capacitance electrode 101 and the data lines 106. Thus, there is overlapping capacitance between the self-capacitance electrode 101 and the gate lines 105 as well as between the self-capacitance electrode 101 and the data lines 106. Therefore, the load of the self-capacitance electrode 101 is increased, and the power consumption of the self-capacitance touch panel is increased accordingly, which limits the development of self-capacitance touch panel to larger size.

Therefore, how to reduce the power consumption of a self-capacitance touch panel is a technical problem which is necessary to be solved by those skilled in the art.

SUMMARY

At least one embodiment of the present disclosure provides an in-cell touch panel and a display device which can reduce the power consumption of the self-capacitance touch panel.

At least one embodiment of the present disclosure provides an in-cell touch panel which comprises: a first substrate and a second substrate disposed opposite to each other; a plurality of gate lines and a plurality of data lines which are intersected with and insulated from each other and disposed on one side of the first substrate, which side faces the second substrate; and a plurality of self-capacitance electrodes which are insulated from each other and disposed in a same layer on one side of the first substrate, which side faces the second substrate, or on one side of the second substrate, which side faces the first substrate; wherein, each of the self-capacitance electrodes comprises a plurality of self-capacitance sub-electrodes which are insulated from each other and connecting lines for connecting the self-capacitance sub-electrodes; an orthographic projection on the first substrate of each self-capacitance sub-electrode does not overlap with an orthographic projection on the first substrate of each gate line; and/or an orthographic projection on the first substrate of each self-capacitance sub-electrode does not overlap with an orthographic projection on the first substrate of each data line.

For example, in the touch panel according to an embodiment of the present disclosure, the self-capacitance sub-electrodes are disposed in a matrix; the connecting lines in each self-capacitance electrode comprise: first connecting lines which are parallel to the gate lines and in one-to-one correspondence with rows of self-capacitance sub-electrodes in the self-capacitance electrode and are configured for connecting each of the self-capacitance sub-electrodes in the corresponding line; and second connecting lines which are parallel to the data lines and are configured for connecting respective rows of self-capacitance sub-electrodes in the self-capacitance electrode.

For example, in the touch panel mentioned above according to an embodiment of the present disclosure, the first connecting lines and the gate lines are disposed in a same layer.

For example, in the touch panel mentioned above according to an embodiment of the present disclosure, the second connecting lines and the data lines are disposed in a same layer.

For example, the touch panel mentioned above according to an embodiment of the present disclosure, further comprises a plurality of pixel units which are disposed in a matrix and are disposed on one side of the first substrate, which side faces the second substrate, each of the pixel units comprising a thin film transistor and a pixel electrode, wherein the second connecting lines and the pixel electrodes are disposed in a same layer.

For example, the touch panel according to an embodiment of the present disclosure, further comprises: a plurality of conductive lines which are in one-to-one correspondence with the self-capacitance electrodes and are configured for electrically connecting the corresponding self-capacitance electrodes and a touch detecting chip, wherein the first connecting lines in each self-capacitance electrode and the conductive line corresponding to the self-capacitance electrodes are electrically connected; or the second connecting lines in each self-capacitance electrodes and the conductive lines corresponding to the self-capacitance electrodes are electrically connected; or any one of the self-capacitance sub-electrodes in each self-capacitance electrode and the corresponding conductive lines are electrically connected.

For example, the touch panel according to an embodiment of the present disclosure, further comprises: a plurality of pixel units which are disposed in a matrix and are disposed on one side of the first substrate, which side faces the second substrate, wherein, two adjacent columns of pixel units are set as a pixel unit group, and pixel units in different pixel unit groups are different; the pixel units in each pixel unit group are electrically connected with a same data line; each row of pixel units corresponds to two gate lines, and two pixel units which are in each row of pixel units and belong to a same pixel unit group are respectively electrically connected with the two gate lines which correspond to the row of pixel units; and the conductive lines are disposed at interval each between two adjacent pixel unit groups.

For example, in the touch panel according to an embodiment of the present disclosure, the conductive lines and the data lines are disposed in a same layer.

For example, in the touch panel according to an embodiment of the present disclosure, the self-capacitance sub-electrodes are formed by dividing a common electrode layer which is disposed on one side of the first substrate, which side faces the second substrate.

For example, in the touch panel according to an embodiment of the present disclosure, an orthographic projection on the first substrate of each self-capacitance sub-electrode does not overlap with an orthographic projection on the first substrate of each gate line, or an orthographic projection on the first substrate of each self-capacitance sub-electrode does not overlap with an orthographic projection on the first substrate of each gate line and an orthographic projection on the first substrate of each self-capacitance sub-electrode does not overlap with an orthographic projection on the first substrate of each data line; and the self-capacitance sub-electrodes and the gate lines are disposed in a same layer.

At least one embodiment of the present disclosure further provides a display device comprising any one of in-cell touch panels mentioned above according to at least one embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The shape and size of each component do not reflect the real scale while only to schematically illustrate the content of embodiments of the present disclosure.

Figure 2:
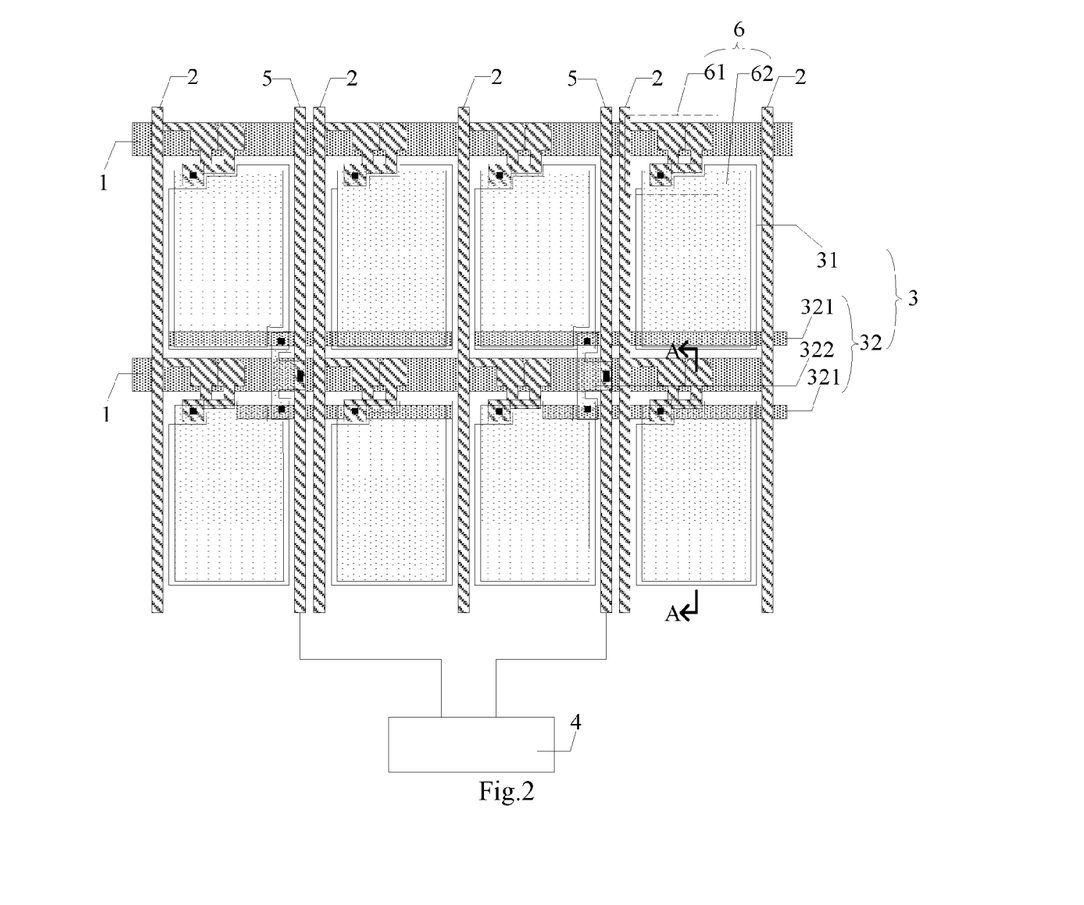
FIG. 2 and FIG. 3 are structure schematic views of an in-cell touch panel according to an embodiment of the present disclosure.
Figure 3:
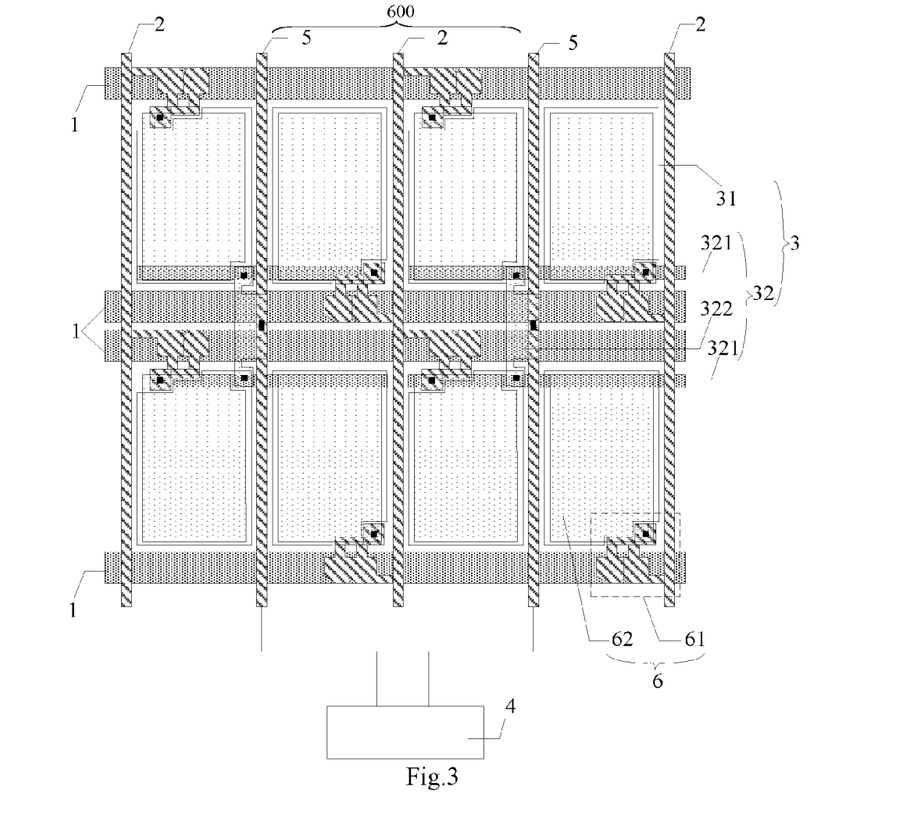
Figure 4A:
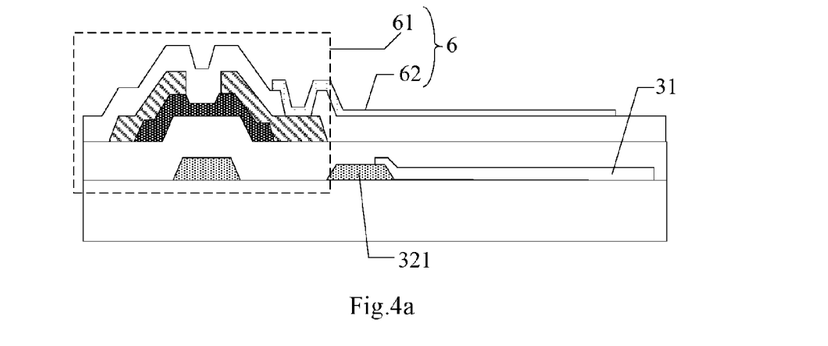
FIG. 4a is a cross-section schematic view along direction AA in FIG. 2.
Figure 4B:
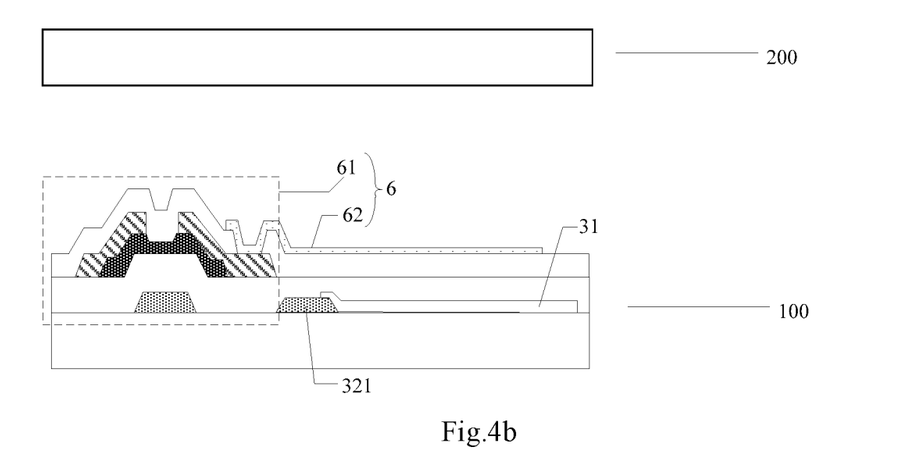
FIG. 4b is a cross-section structure schematic view of an in-cell touch panel according to an embodiment of the present disclosure.

An embodiment of the present disclosure provides an in-cell touch panel, as shown in FIG. 2 and FIG. 3, comprising: a first substrate 100 and a second substrate 200 disposed opposite to each other (the first substrate 100 and the second substrate 200 are not shown in FIG. 2 and FIG. 3 but can be referred to in FIG. 4b), a plurality of gate lines 1 and a plurality of data lines 2 which are intersected with and insulated from each other (cross with each other and insulated from each other) and disposed on one side of the first substrate, which side faces the second substrate; and a plurality of self-capacitance electrodes 3 which are insulated from each other and disposed in a same layer on one side of the first substrate, which side faces the second substrate, or on one side of the second substrate, which side faces the first substrate (in FIG. 2 and FIG. 3, the self-capacitance electrodes 3 are disposed on one side of the first substrate, which side faces the second substrate, and this configuration is taken as an example).

Each of the self-capacitance electrodes 3 comprises a plurality of self-capacitance sub-electrodes 31 which are insulated from each other and comprises connecting lines 32 for connecting the self-capacitance sub-electrodes 31.

An orthographic projection on the first substrate of each self-capacitance sub-electrode 31 does not overlap with an orthographic projection on the first substrate of each gate line 1; and/or an orthographic projection on the first substrate of each self-capacitance sub-electrode 31 does not overlap with an orthographic projection on the first substrate of each data line 2.

In the in-cell touch panel according to an embodiment of the present disclosure, each of the self-capacitance electrodes comprises a plurality of self-capacitance sub-electrodes which are insulated from each other and connecting lines for connecting the self-capacitance sub-electrodes; an orthographic projection on the first substrate of each self-capacitance sub-electrode does not overlap with an orthographic projection on the first substrate of each gate line; and/or an orthographic projection on the first substrate of each self-capacitance sub-electrode does not overlap with an orthographic projection on the first substrate of each data line. Thus, there is almost no overlapping area between the self-capacitance electrodes and the gate lines, and/or there is almost no overlapping area between the self-capacitance electrodes and the data lines; accordingly there is almost no overlapping capacitance between the self-capacitance electrodes and the gate lines, and/or there is almost no overlapping capacitance between the self-capacitance electrodes and the data lines; therefore, the load of the self-capacitance electrode can be remarkably reduced, and thus the power consumption of the in-cell touch panel can be reduced. The configuration is especially appropriate for the in-cell touch panel of large size and has a wide application scope.

For example, in the touch panel according to an embodiment of the present disclosure, as shown in FIG. 2 and FIG. 3, the self-capacitance electrodes 3 can be disposed on one side of the first substrate, which side faces the second substrate, i.e., the self-capacitance electrodes 3, the gate lines 1 and data lines 2 are disposed on the same substrate; in this situation, it is required that the self-capacitance electrodes 3 are insulated from the gate lines 1 and data lines 2. Or, the self-capacitance electrodes also can be disposed on one side of the second substrate, which side faces the first substrate, i.e., the self-capacitance electrodes and the gate lines are disposed on two different substrates. The arrangement is not limitative herein.

For example, in the touch panel according to an embodiment of the present disclosure, an orthographic projection on the first substrate of each self-capacitance sub-electrode does not overlap with an orthographic projection on the first substrate of each gate line only, and an orthographic projection on the first substrate of a self-capacitance sub-electrode overlaps with an orthographic projection on the first substrate of a data line; or, an orthographic projection on the first substrate of each self-capacitance sub-electrode does not overlap with an orthographic projection on the first substrate of each data line only, and an orthographic projection on the first substrate of a self-capacitance sub-electrode overlaps with an orthographic projection on the first substrate of a gate line; or, as shown in FIG. 2 and FIG. 3, an orthographic projection on the first substrate of each self-capacitance sub-electrode 3 neither overlaps with an orthographic projection on the first substrate of each gate line 1 nor overlaps with an orthographic projection on the first substrate of each data line 2. The arrangement is not limitative herein.

For example, in the touch panel according to an embodiment of the present disclosure, as shown in FIG. 2 and FIG. 3, the self-capacitance sub-electrodes 31 are disposed in a matrix. The connecting line 32 for each self-capacitance electrode 3 can comprise: first connecting lines 321 which are parallel to the gate lines 1 and in one-to-one correspondence with rows of self-capacitance sub-electrodes 31 of the self-capacitance electrode 3 and are configured for connecting the self-capacitance sub-electrodes 31 in the corresponding rows; and a second connecting line 322 which is parallel to the data lines 2 and are configured for connecting each of rows of self-capacitance sub-electrodes 31 of the self-capacitance electrode 3. For example, as shown in FIG. 2 and FIG. 3, each self-capacitance electrode 3 comprises self-capacitance sub-electrodes 31 disposed in 2 rows and 2 columns; two self-capacitance sub-electrodes 31 which are in each row and belong to a same self-capacitance electrode 3 are electrically connected by a first connecting line 321; and the self-capacitance sub-electrode 31 disposed in the first row of each self-capacitance electrode 3 and the self-capacitance sub-electrode 31 disposed in the second row of each self-capacitance electrode 3 are electrically connected by the second connecting line 322.

It should be noted that, in the touch panel according to an embodiment of the present disclosure, the first connecting lines and the second connecting line(s) are made from an opaque metal. In this instance, the first connecting lines and the second connecting line(s) need to be shielded by a black matrix, to avoid the problem of light leakage of the touch panel.

For example, the touch panel according to an embodiment of the present disclosure, as shown in FIG. 2 and FIG. 3, can further comprise: a plurality of conductive lines 5 which are in one-to-one correspondence with the self-capacitance electrodes 3 and are configured for electrically connecting the corresponding self-capacitance electrodes 3 with a touch detecting chip 4. The first connecting lines for each self-capacitance electrode and the conductive line corresponding to the self-capacitance electrode are electrically connected, or, as shown in FIG. 2 and FIG. 3, the second connecting line 322 for each self-capacitance electrode 3 and the conductive line 5 corresponding to the self-capacitance electrode 3 are electrically connected. The arrangement is not limitative herein.

Of course, in the touch panel according to each embodiment of the present disclosure, each self-capacitance electrode and the corresponding conductive line are electrically connected, the method of which is not limited to such two ways that the first connecting lines for the self-capacitance electrode and the corresponding conductive lines are electrically connected or the second connecting lines for the self-capacitance electrode and the corresponding conductive lines are electrically connected. For example, if the self-capacitance sub-electrode overlaps with the data lines, any one of self-capacitance sub-electrodes in the self-capacitance electrode and the corresponding conductive line can be electrically connected. The arrangement is not limitative herein.

For example, the touch panel according to an embodiment of the present disclosure can be applied to a liquid crystal display (LCD). That is, the first substrate is an array substrate, and the second substrate is an opposite substrate. The opposite substrate is, for instance, a color filter substrate. For example, the touch panel according to an embodiment of the present disclosure can be applied to an advanced super dimension switch (ADS) mode LCD or an in-plane switch (IPS) mode LCD. That is, the common electrode layer is disposed on one side of the first substrate (i.e., the array substrate), which side faces the second substrate (i.e., the opposite substrate); or, the touch panel according to an embodiment of the present disclosure can be applied to a twisted nematic (TN) mode LCD. That is, the common electrode layer is disposed on one side of the second substrate (i.e., the opposite substrate), which side faces the first substrate (i.e., the array substrate). The arrangement is not limitative herein.

For example, in the touch panel according to an embodiment of the present disclosure, the common electrode layer can be divided into a plurality of independent common sub-electrodes which can be reused as the self-capacitance sub-electrodes. Thus, self-capacitance electrodes do not need to be disposed separately, which can reduce the overall thickness of the touch panel, simplify the manufacturing process of the touch panel, and reduce the cost of manufacturing the touch panel. For example, if the touch panel according to an embodiment of the present disclosure is applied to an ADS mode LCD, self-capacitance sub-electrodes can be formed by dividing the common electrode layer which is disposed on one side of the first substrate (i.e., the array substrate), which side faces the second substrate (i.e., the opposite substrate).

Further, in the touch panel according to an embodiment of the present disclosure, as shown in FIG. 4a (FIG. 4a is a cross-section schematic view along direction AA in FIG. 2), the self-capacitance sub-electrodes 31 and the gate lines 1 can be disposed in the same layer. Thus, the overall thickness of the touch panel can be further reduced. In this situation, in order to insure that the self-capacitance sub-electrodes 31 and the gate lines 1 are insulated from each other, it is required that an orthographic projection on the first substrate of each self-capacitance sub-electrode 31 does not overlap with an orthographic projection on the first substrate of each gate line 1 and each data line 2.

As shown in FIG. 4b, the in-cell touch panel according to an embodiment of the present disclosure comprises: the first substrate 100 and the second substrate 200 disposed opposite to each other, and can further comprises a liquid crystal layer disposed between the first substrate 100 and the second substrate 200. The first substrate 100 is, for instance, an array substrate, and the second substrate 200 is, for instance, a color filter substrate. For example, the array substrate provides a driving electric field which drives the liquid crystal to rotate; the liquid crystal rotates for controlling whether the light emitted from a backlight transmits through it or not in the display process; and the transmitted light is colorized by the color filter substrate and thus to realize the image display.

In the following embodiments, the self-capacitance sub-electrodes are formed by dividing the common electrode layer disposed on one side of the first substrate, which side faces the second substrate, and the self-capacitance sub-electrodes and the gate lines are disposed in a same layer, which is taken as an example to be illustrated.

For example, in the touch panel according to an embodiment of the present disclosure, the first connecting lines for connecting respective rows of self-capacitance sub-electrodes in each self-capacitance electrode are parallel to the gate lines; therefore, the first connecting lines and the gate lines can be disposed in a same layer, i.e., the first connecting lines and the gate lines can be formed from a same material and formed in a single mask process. Thus, in the manufacturing process of the touch panel according to embodiments of the present disclosure, the number of mask process is not increased by adding the first connecting lines, and the processes of manufacturing the touch panel are not increased.

It should be noted that, in the touch panel according to an embodiment of the present disclosure, the self-capacitance sub-electrodes and the gate lines are disposed in a same layer; and the first connecting lines and the gate lines are disposed in a same layer. Therefore, the self-capacitance sub-electrodes and the first connecting lines are disposed in a same layer. Therefore, each row of self-capacitance sub-electrodes in each self-capacitance electrode can be directly electrically connected by a first connecting line. For example, the first connecting lines can be each disposed at an interval between two adjacent self-capacitance sub-electrodes in each row of self-capacitance sub-electrodes in each self-capacitance electrode, i.e., the first connecting lines do not overlap with the self-capacitance sub-electrodes. Thus, the first connecting lines do not occupy the aperture area of the touch panel, and do not reduce the aperture ratio of the touch panel.

For example, in the touch panel according to an embodiment of the present disclosure, the second connecting line for connecting the rows of self-capacitance sub-electrodes in each self-capacitance electrode overlaps with a gate line. Thus, in order to avoid the short between the second connecting line and the gate line, it should be required that the second connecting line and the gate line are disposed in different layers. For example, the second connecting lines and the data lines can be disposed in a same layer (it is required that the second connecting lines and the data lines are insulated from each other), i.e., the second connecting lines and the data lines are formed from a same material and formed in a same mask process. Thus, in the process of manufacturing the touch panel according to embodiments of the present disclosure, the number of mask process is not increased by adding the second connecting lines, and the processes of manufacturing the touch panel are not increased.

It should be noted that, in the touch panel according to an embodiment of the present disclosure, the self-capacitance sub-electrodes and the gate lines are disposed in a same layer; the second connecting lines and the data lines are disposed in a same layer; and the second connecting lines and the self-capacitance sub-electrodes are disposed in different layers. Therefore, each row of self-capacitance sub-electrodes in each self-capacitance electrode needs to be electrically connected by a second connecting line through a via hole. For example, the second connecting lines can only overlaps with the self-capacitance sub-electrodes at the area of via holes. The via holes influence the aperture ratio of the touch panel. However, because the via holes are small, the second connecting lines occupy a small aperture area of the touch panel. The aperture ratio of the touch panel can be basically ensured.

For example, the touch panel according to an embodiment of the present disclosure, as shown in FIG. 2 and FIG. 3, further comprises: a plurality of pixel units 6 which are disposed in a matrix and are disposed on one side of the first substrate, which side faces the second substrate; each of the pixel units 6 comprises a thin film transistor 61 and a pixel electrode 62. The second connecting lines 322 for connecting respective rows of self-capacitance sub-electrodes 31 in each self-capacitance electrode 3 overlap with the gate lines 1. Thus, in order to avoid the short between the second connecting lines 322 and the gate lines 1, it is required that the second connecting lines 322 and the gate lines 1 are disposed in different layers. For example, the second connecting lines 322 and the pixel electrodes 62 can be disposed in a same layer (it should be required that the second connecting lines 322 and the pixel electrodes 62 are insulated from each other), i.e., the second connecting lines 322 and the pixel electrodes 62 are formed from a same material and formed in a same mask process. Thus, in the process of manufacturing the touch panel, the number of mask process is not increased by adding the second connecting lines 322, and the processes of manufacturing the touch panel are not increased. Further, because the self-capacitance sub-electrodes 31 and the gate lines 1 are disposed in a same layer, and the second connecting lines 322 and the pixel electrodes 62 are disposed in a same layer, respective rows of the self-capacitance sub-electrodes 31 in each self-capacitance electrode 3 needs to be electrically connected by the second connecting lines 322 through via holes.

For example, in the touch panel according to an embodiment of the present disclosure, as shown in FIG. 2, a plurality of pixel units 6 are disposed on one side of the first substrate, which side faces the second substrate. For example, a pixel unit 6 is defined by two adjacent gate lines 1 and two adjacent data lines 2; the conductive lines 5 which are in one-to-one correspondence with the self-capacitance electrodes 3 and are electrically connected with the self-capacitance electrodes 3 are disposed at intervals between two adjacent rows of pixel units 6, i.e., the light shielding area where the data lines 2 are disposed. Obviously, the conductive lines 5 occupy the aperture area of the touch panel, thus the aperture ratio of the touch panel is reduced.

Based on the above, a dual gate structure can be applied to the touch panel according to an embodiment of the present disclosure, as shown in FIG. 3, the touch panel can further comprise: a plurality of pixel units 6 which are disposed on one side of the first substrate, which side faces the second substrate and are disposed in a matrix. Two adjacent columns of pixel units 6 are set as a pixel unit group 600, and pixel units 6 in different pixel unit groups 600 are different; the pixel units 6 in each pixel unit group 600 are electrically connected with a same data line 2; each row of pixel units 6 corresponds to two gate lines 1, and two pixel units 6 which are in each row of pixel units 6 and belong to a same pixel unit group 600 are electrically connected with the two gate lines 1 which correspond to the row of pixel units 6 respectively. The dual gate structure saves area for parts of the data lines 2 by doubling the number of the gate lines 1. Thus, the conductive lines 5 can be disposed at intervals between two adjacent pixel unit groups, i.e., the conductive lines 5 are disposed at intervals where the data lines 2 are not disposed between two adjacent pixel unit groups. In this arrangement mode, the conductive lines 5 are disposed in the area where the data lines 2 are not disposed in the dual gate structure, which would not occupy much of the aperture area and therefore can ensure the maximum aperture ratio of the touch panel, and also can avoid the interference to the signal transmitted in the data lines 2 from the signal transmitted in the conductive lines 5.

For example, in the touch panel according to an embodiment of the present disclosure, the conductive lines and the data lines can be disposed in a same layer, i.e., the conductive lines and the data lines are formed from a same material and are formed in a same patterning process. Therefore, the overall thickness of the touch panel can be further reduced, the process of manufacturing the touch panel is simplified, and the cost of manufacturing the touch panel is reduced.

It should be noted that, in the touch panel according to at least one embodiment of the present disclosure, if the first connecting lines and the gate lines are disposed in a same layer, the conductive lines and the data lines are disposed in a same layer, and each self-capacitance electrode and the corresponding conductive line are connected by the first connecting lines, because a gate insulating layer is disposed between the layer where the gate lines are disposed and the layer where the data lines are disposed, the first connecting lines and the conductive lines are disposed in different layers. Therefore, the conductive lines and the first connecting lines are electrically connected through via holes. If the second connecting lines and the data lines are disposed in a same layer, the conductive lines and the data lines are disposed in a same layer, and each self-capacitance electrode and the corresponding conductive line are electrically connected by the second connecting line, because the second connecting lines and the conductive lines are disposed in a same layer, the conductive lines and the second connecting lines can be directly electrically connected not through via holes. If the second connecting lines and the pixel electrodes are disposed in a same layer, the conductive lines and the data lines are disposed in a same layer, and each self-capacitance electrode and the corresponding conductive line are electrically connected by the second connecting line, because an insulating layer is usually disposed between the layer where the pixel electrodes are disposed and the layer where the data lines are disposed, the second connecting lines and the conductive lines are disposed in different layers. Thus, the conductive lines and the second connecting lines are electrically connected through via holes.

Based on the same inventive concept, embodiments of the present disclosure further provide a display device which comprises: any one of the in-cell touch panel according to embodiments of the present disclosure. The display device can be any product or component having a display function such as mobile phone, watch, tablet computer, television, display, laptop computer, digital camera, navigator or the like. Any one of the embodiments of the in-cell touch panel can be referred to implement the display device, which is not repeated herein.

At least one embodiment provides an in-cell touch panel and a display device. In the in-cell touch panel, each of the self-capacitance electrodes comprises a plurality of self-capacitance sub-electrodes which are insulated from each other and connecting lines for connecting the self-capacitance sub-electrodes; an orthographic projection on the first substrate of each self-capacitance sub-electrode does not overlap with an orthographic projection on the first substrate of each gate line; and/or an orthographic projection on the first substrate of each self-capacitance sub-electrode does not overlap with an orthographic projection on the first substrate of each data line. Thus, there is almost no overlapping area between the self-capacitance electrodes and the gate lines and/or there is almost no overlapping area between the self-capacitance electrodes and the data lines, and accordingly there is almost no overlapping capacitance between the self-capacitance electrodes and the gate lines and/or there is almost no overlapping capacitance between the self-capacitance electrodes and the data lines. Therefore, the load of the self-capacitance electrode can be obviously reduced, and thus the power consumption of the in-cell touch panel can be reduced, which is especially appropriate for the in-cell touch panel of large size and has a wide application scope.

It should be noted as follows:

(1) The drawings of the embodiments of the present disclosure only relate to the structure in connection with the embodiments of the present disclosure, and conventional design can be referred to for other structures.

(2) For clarity, in the figures for describing the embodiments of the present disclosure, the thicknesses of layers or regions are exaggerated or diminished, i.e., the drawings are not drawn to actual scale.

(3) The phrases "connect", "connected", etc., are not intended to define a physical connection or mechanical connection, but may further include an electrical connection, directly or indirectly.

(4) Without conflict, embodiments of the present disclosure and features in the embodiments can be combined with each other to obtain new embodiments.

What are described above is related to the illustrative embodiments of the disclosure only and not limitative to the scope of the disclosure, any various changes or replacement within the scope of the disclosure, which can be easily thought out by those skilled in the art, should be included within the scope of the present disclosure. Therefore, the scopes of the disclosure are defined by the accompanying claims.

The present application claims the priority of the Chinese Patent Application No. 201510349956.7 filed on Jun. 23, 2015, which is incorporated herein in its entirety by reference as part of the disclosure of the present application.

What is claimed is:

1. An in-cell touch panel, comprising: a first substrate and a second substrate, disposed opposite to each other; a plurality of gate lines and a plurality of data lines which are intersected with and insulated from each other and disposed on one side of the first substrate which side faces the second substrate; and a plurality of self-capacitance electrodes which are insulated from each other and disposed in a same layer on the one side of the first substrate which side faces the second substrate, or on one side of the second substrate which side faces the first substrate, wherein, each of the self-capacitance electrodes comprises a plurality of self-capacitance sub-electrodes, which are insulated from each other, and connecting lines for connecting the self-capacitance sub-electrodes;

an orthographic projection, on the first substrate, of each self-capacitance sub-electrode does not overlap with an orthographic projection, on the first substrate, of each gate line; and/or an orthographic projection, on the first substrate, of each self-capacitance sub-electrode does not overlap with an orthographic projection, on the first substrate, of each data line; and wherein the self-capacitance sub-electrodes are disposed in a matrix;

the connecting lines in each self-capacitance electrode comprise: first connecting lines which are parallel to the gate lines and in a one-to-one correspondence with rows of self-capacitance sub-electrodes in the self-capacitance electrode and are configured for connecting each of the self-capacitance sub-electrodes in the corresponding row; and second connecting lines which are parallel to the data lines and are configured for connecting respective rows of self-capacitance sub-electrodes in the self-capacitance electrode; and wherein the first connecting lines and the gate lines are disposed in a first layer, the second connecting lines and the data lines are disposed in a second layer, and wherein the first layer and the second layer are at different levels, the in-cell touch panel further comprising a plurality of conductive lines which are in one-to-one correspondence with the self-capacitance electrodes and are configured for electrically connecting the corresponding self-capacitance electrodes and a touch detecting chip, wherein, the first connecting lines in each self-capacitance electrode and the conductive lines corresponding to the self-capacitance electrodes are electrically and directly connected, or the second connecting lines in each self-capacitance electrode and the conductive lines corresponding to the self-capacitance electrodes are electrically and directly connected.

2. The touch panel according to claim 1, further comprising a plurality of pixel units which are disposed in a matrix and are disposed on the one side of the first substrate which side faces the second substrate, wherein, two adjacent columns of pixel units are set as a pixel unit group, and pixel units in different pixel unit groups are different; the pixel units in each pixel unit group are electrically connected with a same data line; each row of pixel units corresponds to two gate lines, and two pixel units which are in each row of pixel units and belong to a same pixel unit group are respectively electrically connected with the two gate lines which correspond to the row of pixel units; and the conductive lines are disposed at intervals each between two adjacent pixel unit groups.

3. The touch panel according to claim 2, wherein, the conductive lines and the data lines are disposed in a same layer.

4. The touch panel according to claim 1, further comprising a plurality of pixel units which are disposed in a matrix and are disposed on the one side of the first substrate which side faces the second substrate, each of the pixel units comprising a thin film transistor and a pixel electrode, wherein, the second connecting lines and the pixel electrodes are disposed in a same layer.

5. The touch panel according to claim 1, wherein, the conductive lines and the data lines are disposed in a same layer.

6. The touch panel according to claim 1, wherein, the self-capacitance sub-electrodes are formed by dividing a common electrode layer which is disposed on the one side of the first substrate which side faces the second substrate.

7. The touch panel according to claim 1, wherein an orthographic projection, on the first substrate, of each self-capacitance sub-electrode does not overlap with an orthographic projection, on the first substrate, of each gate line, or an orthographic projection, on the first substrate, of each self-capacitance sub-electrode does not overlap with an orthographic projection, on the first substrate, of each gate line and an orthographic projection, on the first substrate, of each self-capacitance sub-electrode does not overlap with an orthographic projection, on the first substrate, of each data line; and the self-capacitance sub-electrodes and the gate lines are disposed in a same layer.

8. A display device, comprising the in-cell touch panel according to claim 1.

* * * * *